United States Patent [19]

Prause et al.

[11] 4,234,942
[45] Nov. 18, 1980

[54] APPARATUS FOR MEASURING THE LENGTH OF PIPE AND OTHER HOLLOW MEMBERS

[75] Inventors: Benjamin G. Prause, Tomball; John D. Meyers, Plano, both of Tex.

[73] Assignee: D & W International, Inc., Lafayette, La.

[21] Appl. No.: 927,463

[22] Filed: Jul. 24, 1978

[51] Int. Cl.³ .............................................. G01S 11/00
[52] U.S. Cl. .................................. 367/128; 343/112 D
[58] Field of Search ............ 73/601, 597; 343/112 D; 340/16 R; 367/128

[56] References Cited

U.S. PATENT DOCUMENTS 3,566,348  2/1971  Leyden et al. .................. 343/112 D
4,055,830  10/1977  Wilson et al. ................... 343/112 D

*Primary Examiner*—Anthony V. Ciarlante
*Attorney, Agent, or Firm*—Arnold, White & Durkee

[57] ABSTRACT

Pipe measuring apparatus is disclosed. In the preferred embodiment, a transmitter is arranged at one end and a receiver at the other end of the pipe. At the transmitter, there is a tone generator which transmits acoustic signal along the pipe. In addition, a power amplifier drives an output diode which transmits light of a specified frequency, and both are funneled along the pipe to be measured. At the receiving end, an amplifier picks up the sound. In like manner, the light which is transmitted through the pipe is also detected. Both detected signals are amplified. After amplification, their modulating envelopes are compared to one another. There is a time shift which is a function of transmission distance, treating the transmitted light as the reference. This time shift is converted by a scale factor into a multi-digit output. The conversion occurs through the use of a clock connected through a decimal counter which is gated on by the light signal and which is gated off by the advent of the sound signal. The output is proportionate to pipe length, and, with appropriate calibrations, length can be measured directly.

14 Claims, 1 Drawing Figure

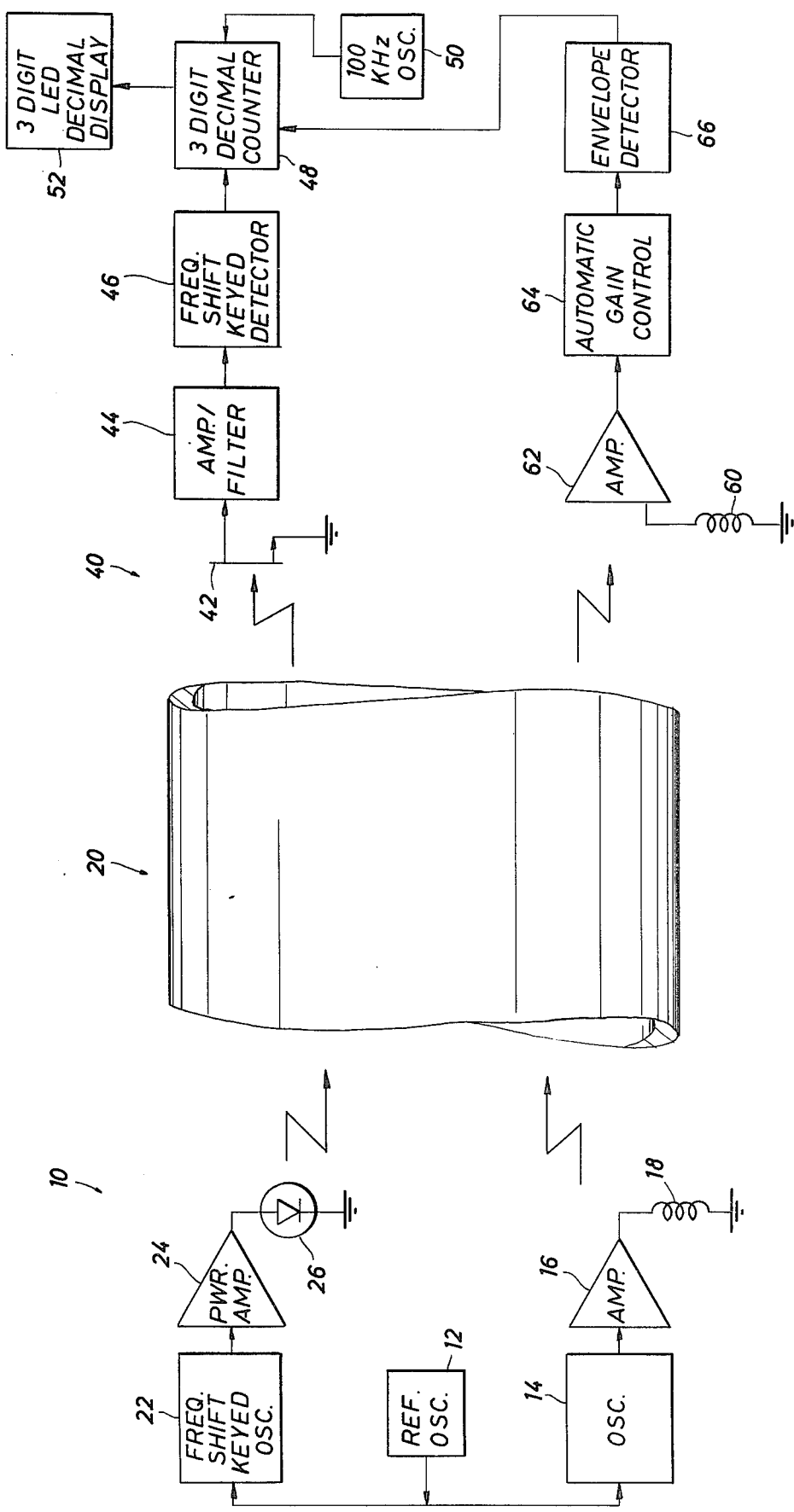

APPARATUS FOR MEASURING THE LENGTH OF PIPE AND OTHER HOLLOW MEMBERS

BACKGROUND OF THE DISCLOSURE

In the oil patch, it is necessary from time to time to measure pipe. The length of pipe available is very important. As an example, it is necessary to know the length of pipe extending from the well head to a downhole location. This is extremely important because it is necessary to spot certain equipment at specified elevations in an oil well. The present invention is a pipe measuring device. It has the advantage that a separate transmitter and receiver units can be deployed so that different people can position the pipe measuring device at opposite ends of pipe stacked on a rack. The two sets of equipment cooperate together nicely in that they transmit two types of signals along the pipe. This enables a user to obtain a quick and ready read-out of each pipe. Preferably, the output signal is formed visually so that it can be read or observed. In the event that a large number of pipe must be measured, the two pieces of equipment are maintained at opposite ends of the pipe rack and shifted from pipe to pipe as readings are taken. The difficulties in measuring pipe in an oil field stem from the fact that the pipe is normally stacked for inventory purposes and is unavailable for ready measurement with the standard tape measuring methods. Presently, methods for measuring pipe inventory in an oil field include a tape measuring crew where the pipe is moved with a fork lift or other apparatus and readings of the individual pipe are taken as they become available with data manually recorded. The pipe must then be restacked completing this costly operation.

BRIEF DESCRIPTION OF THE ILLUSTRATED EMBODIMENT

This invention is a pipe measuring apparatus. It has separate transmitters and receivers. At the transmitter end, there is an acoustic signal transmitter. It forms an audio pulse or burst. In addition, there is incorporated an optical transmitter which transmits a light beam. Both are focused into the pipe, and the pipe conducts the light and sound along the pipe. At the receiver end, the acoustic signal is received, amplified, with its envelope detected; triggering a counter. The optical signal is likewise received and serves as a time reference, starting the counter. The counter is stopped when the acoustic signal is received. The counter runs at a high rate, typically input with pulses at a rate scaled to give a converted reading in feet, meters or the likeby providing it with a procession of pulses from a clock. It forms an output on a suitable output device.

BRIEF DESCRIPTION OF THE DRAWINGS

The single drawing incorporated in the present disclosure depicts a schematic block diagram of the pipe length measuring apparatus and shows a portion of a pipe to be measured.

DETAILED DESCRIPTION OF THE ILLUSTRATED EMBODIMENT

In the drawing, the transmitter is identified by the numeral 10, while the receiver equipment is identified by the numeral 40. A pipe 20 is between the two, and its length is measured. The transmitter incorporates a reference oscillator 12. Any suitable frequency will do, but the preferred frequency range of the reference oscillator is in the sub-audio up to the audio range. This serves as a reference oscillator which forms an output signal to synchronize other oscillators. On the acoustic side of the transmitter 10, an oscillator 14 is gated in its operation to form an output signal applied to an amplifier 16. The amplifier 16 is connected to a speaker coil 18, and the speaker, of course, forms an output acoustic signal. It can be in the audio or ultrasonic range.

To achieve the proper accuracy of measurement, the signal is preferred to be in the ultrasonic range. In any case, the speaker 18 forms an acoustic output tone. It is envelope modulated with the signal from the reference oscillator 12.

The apparatus further includes a frequency shift keyed oscillator 22. It, too, is an oscillator which can operate at any suitable frequency. However, it, again, is modulated by operation of the reference oscillator 12. The input signal gates it off and on to thereby form output signals at the oscillator 22 which are frequency shifted between specified frequencies. As it is provided with the square-wave input signal from the reference oscillator 12, it is switched between 60 and 120 kilohertz outputs.

The frequency shift keyed oscillator 22 is connected to a power amplifier 24 which, in turn, is connected to an infrared light emitting diode 26. If desired, a speaker horn or other focusing lens can enclose the speaker cone 18 and the diode 26. Presumably, they can radiate in all directions, yet, it is desirable to focus their radiation along the pipe 20.

The two output devices are positioned at one open end of the pipe 20. Light and sound travel waves the length of the pipe. The receiving equipment 40 at the other end of the pipe 20 is positioned to receive the light and sound waves. The receiving equipment 40 includes a photo-transistor 42. It is mounted so that it can face the end of pipe where the transmitter 10 is located. The light from the diode 26 falls on the transistor 22 and forms an output signal. The light beam is modulated between two frequencies, and, of course, the receiving transistor 42 follows this modulation to form a signal input to a band pass amplifier 44. It is preferably an amplifier with a high pass filter, at least high enough to screen random noise. The diode 26 is switched in frequency, and, accordingly, the output of the amplifier 44 is a similar gated signal. It is supplied to a frequency shift keyed detector 46. The detector 46 forms an output envelope. The output envelope has the same wave frequency and shape as the signal of the reference oscillator 12. Thus, the reference oscillator can operate at 10 hertz square-wave, and the frequency shift keyed detector 46 forms a similar output signal. It detects the envelope, and the carrier tone is eliminated. Since a variety of lengths of pipe are to be measured using the device, the amplitude of the lightwave emitted from diode 26 will vary drastically as the pipe length varies. This variation in amplitude presents the problem of consistently detecting the electromagnetic wave emitted from the diode 26. Since most detection devices will require a decision threshold i.e. a specific level of amplitude level of the received electromagnetic wave, measuring along varied length of pipe varies this decision threshold making it nearly impossible to meet this criteria. Thus, the frequency shift keyed oscillator 22 is provided to make the electromagnetic wave circuit independent of the amplitude and thus eliminating the problem of a decision threshold detection scheme. Utilizing the frequency shift keyed detector 46 it is unnecessary to consider the amplitude parameter of the electromagnetic wave emitted by the light emitting diode 26. This frequency shift keyed oscillator scheme further eliminates the problem of random noise in the system.

The modulated signal from the diode 26 serves as a trigger for a three-digit decimal counter 48. It is triggered on by each positive going signal. The counter 48 counts pulses which are inputs from a 100 kilohertz oscillator 50. It forms an output at a multi-digit, light emitting diode decimal display 52. The display 52 is driven by the counter 48. Preferably, it has as many digits as the counter 48, and three is adequate for most applications.

On the acoustic side, an ultrasonic, acoustic receiver 60 is focused into the receiving end of the pipe, and it forms an output signal supplied to an amplifier 62. The amplifier detects the sound bursts which are gated off and on from the oscillator 14 in synch with the reference oscillator 12. The shape of this signal is a tone burst in synchronism with the square wave from the reference oscillator 12, and it is supplied to an automatic gain control circuit 64. This is an amplifier which provides adequate boost to the signal. The actual amplitude is not meaningful because the information content is found in the waveform shape, not amplitude. The output of this signal, being a sequence of tone bursts, is then fed to an envelope detector 66. It is envelope detected, and the output, devoid of the carrier, is a square wave which corresponds to the shape of the signal from the reference oscillator 12. Alternatively, if the oscillator 12 provided ramps, spikes or the like, the output would follow this.

The counter 48 has three inputs, one being from the clock 50. It is triggered on to start counting from zero by the signal from the detector 46, this signal being the positive going side of the square wave. The envelope detector 66 turns it off. Again, the positive going portion of the square-wave signal is used. The counter, being triggered first on and subsequently thereafter being turned off, counts to a level depending on the time shift between the two signals. The count is proportionate to the time duration between these two signals. As mentioned above the output is supplied to a display device 52.

In operation, the present invention functions in the following manner. The transmitter equipment 10 is placed adjacent to one end of a pipe, and the receiver equipment 40 is positioned at the other end. Calibration will be first described, this requires the pipe 20 having a known or standard length. The oscillator 50 is tuned to accommodate small variations in the speed of sound, and it is also tuned to provide an output calibrated in the scale or units desired All the scale factors are caught up in the frequency setting of the oscillator as a matter of convenience. A fixed frequency can be used, but it is less convenient. The equipment is switched on at both ends, and the oscillator 12, in particular, forms an output signal. The most convenient signal is a relatively low frequency square wave. Each cycle of the square wave has a positive going signal in each cycle. It amplitude modulates the acoustic signal, and it frequency shift modulates the visual signal. The two signals are focused down the pipe. The received signal at the opposite end includes the two components, namely the acoustic and optical components. It is presumed that the electromagnetic of the signal arrives instantaneously upon transmission. In view of the relative difference between the speed of light and the speed of sound, this assumption does not provide any significant error to the calculations. Accordingly, the received optical signal forms a start pulse for the counter 48. The start pulse conditions the counter 48 for counting from zero. The counter 48 advances at a rate determined by the oscillator 50. The counter 48 is switched off at the end of each cycle by arrival of the acoustic stop signal. It clearly encounters a time lag. This time lag is quite large compared with the nearly instantaneous transmission of the optical signal. The lagged signal received at the acoustic receiving apparatus 40 is amplified, envelope detected, and a positive going signal which is derived from the same pulse of the oscillator 12 thus becomes the stop signal for the counter 48.

At the time of calibration, a pipe of known length is utilized. The oscillator 50 is tuned to a frequency to yield an output which corresponds to the known length. The synchronized signal is thus used to switch the counter 48 off and on, and adjustments are made until calibration has been completed. Thereafter, the calibrated equipment can be used with any other pipe of any reasonable length. It can be used to measure very short pipe. It can be used to measure much longer pipe. Difficulties will arise only when the pipe is quite long. The speed of sound in air at sea level is approximately 1100 feet per second, and, if a reference frequency of 10 hertz is used, there is a full cycle phase shift at 110 feet of pipe. It is for this reason that the reference oscillator is preferably low frequency. Because the device counts from time lag, it is not able to measure pipe which is several multiples in length of the reference oscillator signal wavelength. For short pipe, the reference oscillator frequency can be higher, while, for longer pipe, it is better to decrease the oscillator frequency. An ideal frequency is about 10 hertz. The equipment will work well even at lower frequencies even as low as 5 hertz. Frequency change avoids ambiguities in long pipe, but it does not alter the mode of operation.

The foregoing is directed to the preferred embodiment of the present invention. It will be apparent to those of ordinary skill in this art that many changes and modifications may be made to the preferred embodiment without departing from the spirit and scope of the present invention. The scope thereof is determined by the claims which follow.

We claim:

1. A distance measuring apparatus comprising:
    an electromagnetic wave transmitter including a frequency modulator, for sending a start timing signal in the form of a frequency modulated electromagnetic wave, disposed at a first location;
    an electromagnetic energy sensor disposed at a second location, for detecting said frequency modulated start timing signal, where the difference between said first and second locations equals the distance to be measured;
    an acoustic transmitter for sending an acoustic stop timing signal over said distance to be measured, located at said first location;
    an acoustic receiver for detecting said stop timing signal, located at said second location;
    a reference signal generator for initiating both of said start and stop timing signals; and
    circuit means for calculating the time delay response between the detection of said start time signal and said stop timing signal.

2. A distance measuring apparatus as set forth in claim 1 wherein said electromagnetic wave is in the form of an optical wave.

3. A distance measuring apparatus as set forth in claim 1 wherein said acoustic signal is in the form of an ultrasonic signal.

4. A distance measuring apparatus as set forth in claim 1 wherein said electromagnetic wave transmitter comprises a frequency shift keyed oscillator, operatively associated with said reference signal generator; a power amplifier, electrically connected with said frequency shift keyed oscillator; and an optical generating source electrically connected to an operatively associated with said frequency shift keyed oscillator and said power amplifier.

5. A distance measuring apparatus as set forth in claim 4 wherein said optical light source comprises a light emitting diode.

6. A distance measuring apparatus as set forth in claim 4 wherein said electromagnetic energy sensor comprises a light sensitive transistor for receiving said frequency modulated start timing signal; a high pass filter electrically connected to said light sensitive transistor for screening random noise from said sensor, and a frequency shift keyed detector for sensing said frequency modulated start timing signal independent of the amplitude of said start timing signal.

7. A distance measuring apparatus as set forth in claim 1 wherein said acoustic transmitter comprises an oscillator operatively associated with said reference signal generator for providing a carrier signal; an amplifier electrically connected to said oscillator for amplifying said carrier signal, and an acoustic transducer electrically connected to said amplifier and said oscillator operatively associated therewith for generating said acoustic stop timing signal.

8. A distance measuring apparatus as set forth in claim 1 wherein said acoustic receiver comprises an acoustic transducer, for receiving said acoustic stop timing signal, and changing said acoustic signal to an electrical signal; an amplifier, electrically connected to said acoustic transducer and operatively associated therewith, for amplifying said electrical signal, signal gain control control circuitry electrically connected to said amplifier, for adjusting the gain of said electrical signal; and an envelope detector for detecting the arrival of said acoustic signal.

9. A distance measuring apparatus as set forth in claim 1 wherein said reference signal generator comprises a low frequency signal oscillator.

10. A distance measuring apparatus as set forth in claim 1 wherein said circuit means comprises a decimal counter electrically connected to said electromagnetic energy sensor and said acoustic receiver and operatively associated therewith, wherein signals from each of said sensor and receiver initiate and terminate said counter function; and a high frequency oscillator for generating a series of pulses to said decimal counter for calculating the time delay between the initiating of said decimal counter by said start timing signal and the terminating of said decimal counter by said stop timing signal.

11. A distance measuring apparatus as set forth in claim 1 further including a display means for providing a visual output of said time delay response.

12. A distance measuring apparatus comprising means for transmitting two distinct quantums of energy from a first location to a second location, where the difference between said first and second location is the distance to be measured, with one of said quantums of energy being electromagnetic in nature and frequency modulated, and said second quantum of energy being acoustic in nature; means for receiving said two distinct quantums of energy; and circuit means for calculating the time delay response between the detection of said two distinct quantums of energy electrically connected to and operatively associated with said means for receiving said two distinct quantums of energy.

13. A method for measuring distance comprising the steps of:
generating an electromagnetic signal at a first location for creating a start timing signal,
frequency modulating said start timing signal at said first location,
generating an acoustic signal for providing a stop timing signal at said first location,
initiating both of said start and stop timing signals with a low frequency signal oscillator;
sensing said frequency modulated start timing signal at a second location wherein the difference in distance between said first and second location equals the distance to be measured;
detecting said acoustic signal at said second location; and
calculating the time delay response between the detection of said electromagnetic signal and said acoustic signal.

14. A method for measuring distance as set forth in claim 13 further including the step of displaying the calculation of said time delay response between the detection of said electromagnetic signal and said acoustic signal and calibrating said time delay to be proportional to the measurement of said distance to be measured.

* * * * *

UNITED STATES PATENT AND TRADEMARK OFFICE
CERTIFICATE OF CORRECTION

PATENT NO. : 4,234,942

DATED : November 18, 1980

INVENTOR(S) : Benjamin G. Prause and John D. Meyers

It is certified that error appears in the above-identified patent and that said Letters Patent are hereby corrected as shown below:

Column 2, line 1, after "tor" insert --12--.

Column 3, line 67, after "electromagnetic" insert --wave--.

Column 4, line 37, after "frequencies" insert --,--.

Signed and Sealed this

Seventh Day of April 1981

[SEAL]

Attest:

RENE D. TEGTMEYER

Attesting Officer

Acting Commissioner of Patents and Trademarks